US010947128B2

(12) United States Patent
Jeong et al.

(10) Patent No.: US 10,947,128 B2
(45) Date of Patent: Mar. 16, 2021

(54) LIQUID PURIFIER

(71) Applicant: LG ELECTRONICS INC., Seoul (KR)

(72) Inventors: Soongy Jeong, Seoul (KR); Kyeongbo Kim, Seoul (KR); Jungmin Moon, Seoul (KR); Junghyun Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 16/034,563

(22) Filed: Jul. 13, 2018

(65) Prior Publication Data
US 2019/0016607 A1 Jan. 17, 2019

(30) Foreign Application Priority Data

Jul. 13, 2017 (KR) .................. 10-2017-0089257

(51) Int. Cl.
*C02F 1/00* (2006.01)
*B01D 35/30* (2006.01)
(Continued)

(52) U.S. Cl.
CPC ........... *C02F 1/003* (2013.01); *A47J 31/4403* (2013.01); *B01D 35/30* (2013.01); *B67D 3/0061* (2013.01);
(Continued)

(58) Field of Classification Search
CPC .... F25D 31/002; F25D 23/006; F25D 29/005; F25D 31/005; F25D 31/003;
(Continued)

(56) References Cited

U.S. PATENT DOCUMENTS 1,488,696 A * 4/1924 Moffat ................ B01D 36/001
210/120
3,757,814 A * 9/1973 Hill ........................ F16K 19/00
137/268
(Continued)

FOREIGN PATENT DOCUMENTS

KR 10-2010-0054580 5/2010
KR 10-1381803 4/2014
KR 10-2015-0134158 12/2015

OTHER PUBLICATIONS

Indian Office Action dated Oct. 31, 2019 issued in IN Application No. 201814026129.
(Continued)

*Primary Examiner* — Joseph W Drodge
(74) *Attorney, Agent, or Firm* — KED & Associates, LLP

(57) ABSTRACT

A water purifier includes a filter housing defining an accommodation space therein, a water discharge module including a water purifier body including a housing defining an outer appearance and a filter provided in the housing to filter raw water introduced from the outside and a water discharge nozzle mounted on the water purifier body to supply the water passing through the filter to the outside of the water purifier body, and a tray provided below the water discharge module. The water discharge module includes an elevation unit elevatably mounted on a front surface of the water purifier body so as to be elevated with respect to the water purifier body and a rotator having one side in which the water discharge nozzle is provided, rotatably mounted on the elevation unit, and allowing the water discharge nozzle to vary in position while being rotated with respect to the elevation unit.

20 Claims, 10 Drawing Sheets

(51) Int. Cl.
 *B67D 3/00* (2006.01)
 *A47J 31/44* (2006.01)
(52) U.S. Cl.
 CPC ............ *B67D 2210/0001* (2013.01); *C02F 2201/002* (2013.01); *C02F 2307/10* (2013.01)
(58) Field of Classification Search
 CPC .......... F25D 2323/121; F25D 2400/02; F25D 11/00; F25D 17/04; F25D 17/045; F25D 17/047; F25D 23/003; F25D 2323/122; B01D 35/185; B01D 35/1435; B01D 1/28; B01D 5/006; B01D 5/0072; B01D 35/04; B01D 35/14; B01D 1/289; B01D 29/60; B01D 35/02; B01D 35/18; B01D 35/30; B01D 35/305; B01D 2201/04; B01D 2201/0415; B01D 2201/0423; B01D 2201/29; B01D 2201/30; B01D 2201/301; B01D 2201/302; B01D 2201/303; B01D 2201/31; C02F 1/003; C02F 1/008; C02F 2209/445; C02F 2209/02; C02F 2307/10; C02F 2201/002; A47J 31/00; A47J 31/4403; A47J 31/54; B67D 1/12; B67D 2210/0005; B67D 2210/0001; B67D 2210/00031; B67D 2210/00039; B67D 3/00058; B67D 3/0061; F25B 31/00; F25B 31/006; F25B 39/00; F25B 39/02; F25B 39/04; F25B 41/00; F25B 43/00; F25B 43/003; F25B 2339/01; E03C 1/04; E03C 1/0404; E03C 1/0412; E03C 2001/0414; F16K 5/00; F16K 27/00; F16K 27/06; F16K 27/065; F16K 27/12
 USPC ........ 137/801; 210/143, 149, 175, 184, 186, 210/232, 435, 449, 483; 62/259.1, 259.4, 62/311, 389; 222/52, 61, 186.06, 189.11, 222/410, 411

See application file for complete search history.

(56) References Cited

U.S. PATENT DOCUMENTS

| | | | | |
|---|---|---|---|---|
| 4,844,796 A * | 7/1989 | Plester | ............ | C02F 9/005 210/100 |
| 5,484,510 A * | 1/1996 | Hartman | ............ | B01D 3/42 202/162 |
| 5,587,055 A * | 12/1996 | Hartman | ............ | C02F 9/005 203/1 |
| 5,776,333 A * | 7/1998 | Plester | ............ | E03B 7/074 210/104 |
| 5,788,840 A * | 8/1998 | Lee | ............ | B67D 1/0861 210/435 |
| 5,858,248 A * | 1/1999 | Plester | ............ | C02F 5/025 210/103 |
| 6,264,830 B1 * | 7/2001 | Plester | ............ | C02F 9/005 210/103 |
| 6,451,211 B1 * | 9/2002 | Plester | ............ | C02F 5/025 210/100 |
| 6,495,049 B1 * | 12/2002 | Van Esch | ............ | C02F 9/005 210/103 |
| 6,640,052 B1 * | 10/2003 | Lao | ............ | B01D 3/42 202/202 |
| 6,739,681 B1 * | 5/2004 | Sharrow | ............ | D06F 34/28 312/327 |
| 6,821,414 B1 * | 11/2004 | Johnson | ............ | C02F 1/008 210/181 |
| 7,294,257 B2 * | 11/2007 | Jackson | ............ | B01D 29/114 210/167.21 |
| 7,645,381 B2 * | 1/2010 | Oranski | ............ | B67D 1/0895 210/198.1 |
| 8,395,334 B2 * | 3/2013 | Eom | ............ | A47B 88/40 318/286 |
| 9,162,158 B2 * | 10/2015 | Ba-abbad | ............ | C02F 1/14 |
| 9,523,514 B2 * | 12/2016 | Lilley | ............ | F24H 1/0018 |
| 10,053,349 B2 * | 8/2018 | Yoon | ............ | B67D 1/0888 |
| 10,188,972 B2 * | 1/2019 | You | ............ | B01D 29/15 |
| 10,408,533 B2 * | 9/2019 | Kim | ............ | B01D 5/0072 |
| 10,583,380 B2 * | 3/2020 | You | ............ | F25D 23/12 |
| 2003/0015242 A1 * | 1/2003 | Kwak | ............ | B67D 3/0025 137/613 |
| 2003/0057811 A1 * | 3/2003 | Byrne | ............ | D06F 39/12 312/265.6 |
| 2004/0118872 A1 * | 6/2004 | Romanyszyn | ............ | B67D 1/0021 222/129.1 |
| 2005/0268638 A1 * | 12/2005 | Voglewede | ............ | F25D 23/126 62/389 |
| 2005/0279689 A1 * | 12/2005 | Oranski | ............ | C02F 9/005 210/198.1 |
| 2008/0314065 A1 * | 12/2008 | Kim | ............ | F25D 23/028 62/389 |
| 2010/0071401 A1 * | 3/2010 | Jang | ............ | F25D 23/028 62/391 |
| 2010/0175783 A1 * | 7/2010 | Kim | ............ | F25D 23/126 141/198 |
| 2011/0174162 A1 * | 7/2011 | Ullmann | ............ | A47J 31/4403 99/323.3 |
| 2012/0061382 A1 * | 3/2012 | Yang | ............ | H05B 6/108 219/628 |
| 2012/0222999 A1 * | 9/2012 | Ha | ............ | C02F 1/008 210/175 |
| 2012/0296489 A1 * | 11/2012 | Lee | ............ | H02J 3/008 700/297 |
| 2014/0049926 A1 * | 2/2014 | Bas | ............ | H05K 1/00 361/759 |
| 2014/0230481 A1 * | 8/2014 | Yun | ............ | F25D 29/005 62/340 |
| 2014/0239521 A1 * | 8/2014 | Ergican | ............ | B67D 1/0058 261/115 |
| 2015/0048731 A1 * | 2/2015 | Penuel | ............ | F24C 7/085 312/326 |
| 2015/0053715 A1 * | 2/2015 | Segiet | ............ | B67D 1/0882 222/1 |
| 2015/0300729 A1 * | 10/2015 | Seo | ............ | F25D 23/126 62/126 |
| 2016/0076779 A1 * | 3/2016 | Lee | ............ | F24F 1/10 62/508 |
| 2016/0183716 A1 * | 6/2016 | Harrington | ............ | B01F 15/0212 366/182.2 |
| 2016/0209104 A1 * | 7/2016 | Baek | ............ | B01F 3/04439 |
| 2016/0223247 A1 * | 8/2016 | Yun | ............ | F25C 5/22 |
| 2017/0030006 A1 * | 2/2017 | Lim | ............ | B29C 45/0053 |
| 2017/0050836 A1 * | 2/2017 | Yoon | ............ | B67D 1/0081 |
| 2017/0050837 A1 * | 2/2017 | Kim | ............ | B67D 1/0895 |
| 2017/0153056 A1 * | 6/2017 | Kim | ............ | F25D 23/006 |
| 2017/0172338 A1 * | 6/2017 | Burrows | ............ | A47J 31/3695 |
| 2017/0282105 A1 * | 10/2017 | You | ............ | F25D 23/126 |
| 2017/0320721 A1 * | 11/2017 | Choi | ............ | H05B 6/108 |
| 2018/0162712 A1 * | 6/2018 | Savese | ............ | B67D 3/0029 |
| 2018/0194608 A1 * | 7/2018 | Jeon | ............ | B67D 1/0888 |
| 2018/0353632 A1 * | 12/2018 | Divisi | ............ | A61L 2/24 |
| 2019/0016607 A1 * | 1/2019 | Jeong | ............ | C02F 1/003 |
| 2019/0024962 A1 * | 1/2019 | Lee | ............ | F25D 23/04 |
| 2019/0218109 A1 * | 7/2019 | Jang | ............ | C02F 1/003 |

OTHER PUBLICATIONS

Korean Office Action dated Jun. 29, 2018 issued in copending KR Application No. 10-2017-0089257.

* cited by examiner

LIQUID PURIFIER

CROSS-REFERENCE TO RELATED APPLICATION

This application claims priority under 35 U.S.C. § 119 to Korean Application No. 10-2017-0089257, filed on Jul. 13, 2017, whose entire disclosure is hereby incorporated by reference.

BACKGROUND

1. Field

The present disclosure relates to a water purifier.

2. Background

In general, water purifiers are being used for household purposes as mechanisms that filter water to remove impurities. In case of household water purifiers, the water purifiers are connected to a water supply system to remove floating matters or harmful components, which are contained in tap water and purify as much water as desired by user's manipulation to dispense the purified water.

As described above, household water purifiers are being released in various products, which are capable of dispensing hot water and cold water as well as purified water. Also, in recent years, water purifiers capable of being installed in various installation environments with small sizes are being developed.

A water purifier in which a water discharge part for dispensing water is provided in an upper end of a main body unit, and the water discharge part is rotated at a set angle after being separated from the main body unit and is coupled again is disclosed in Korean Patent Registration No. 10-1381803. In the water purifier having the above-described structure, a user may separate and re-couples the water discharge part to change a position of the water discharge part to a set position in a state in which a position of a main body is maintained. Thus, the water purifier may be installed without being restricted by an installation space of the water purifier. However, the water purifier according to the related art may have following limitations.

First, to change the position of the water discharge part, the water discharge part has to be separated from the main body unit and then be coupled again. Also, while the water discharge part is repeatedly separated and coupled, the coupling portion may be damaged.

Second, since a water discharge tube is connected to the water discharge part, when the water discharge tube is damaged while the water discharge part is separated, water leakage may occur. In addition, when the water discharge part is repeatedly rotated, the water discharge tube or a fitting part to which the water discharge tube is connected may be damaged to cause water leakage.

Third, the position of the water discharge part is determined by a recessed groove defined in the main body unit. Thus, the water discharge part may be provided at only the set position in which the recessed groove is defined, but may not be provided at any position.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

Hereinafter, exemplary embodiments will be described in detail with reference to the accompanying drawings. The disclosure may, however, be embodied in many different forms and should not be construed as being limited to the embodiments set forth herein, and a person of ordinary skill in the art, who understands the spirit of the present disclosure, may readily implement other embodiments included within the scope of the same concept by adding, changing, deleting, and adding components; rather, it will be understood that they are also included within the scope of the present disclosure.

The drawings attached to the following embodiments are embodiments of the scope of the disclosure, but to facilitate understanding within the scope of the present disclosure, in the description of the fine portions, the drawings may be expressed differently according to the drawings, and the specific portions may not be displayed according to the drawings, or may be exaggerated according to the drawings.

Figure 1:
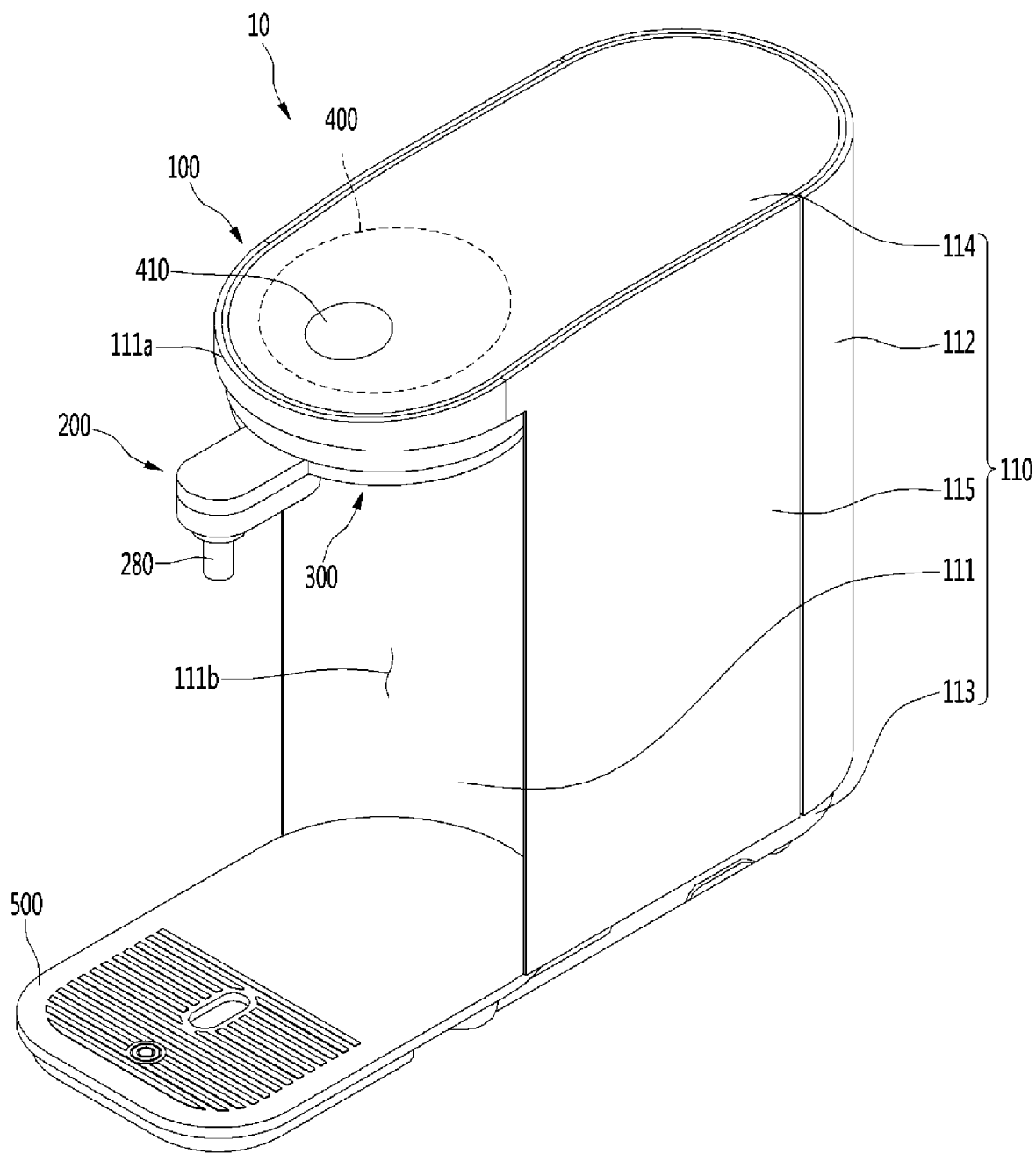
FIG. 1 is a perspective view of a water purifier according to an embodiment.
Figure 2:
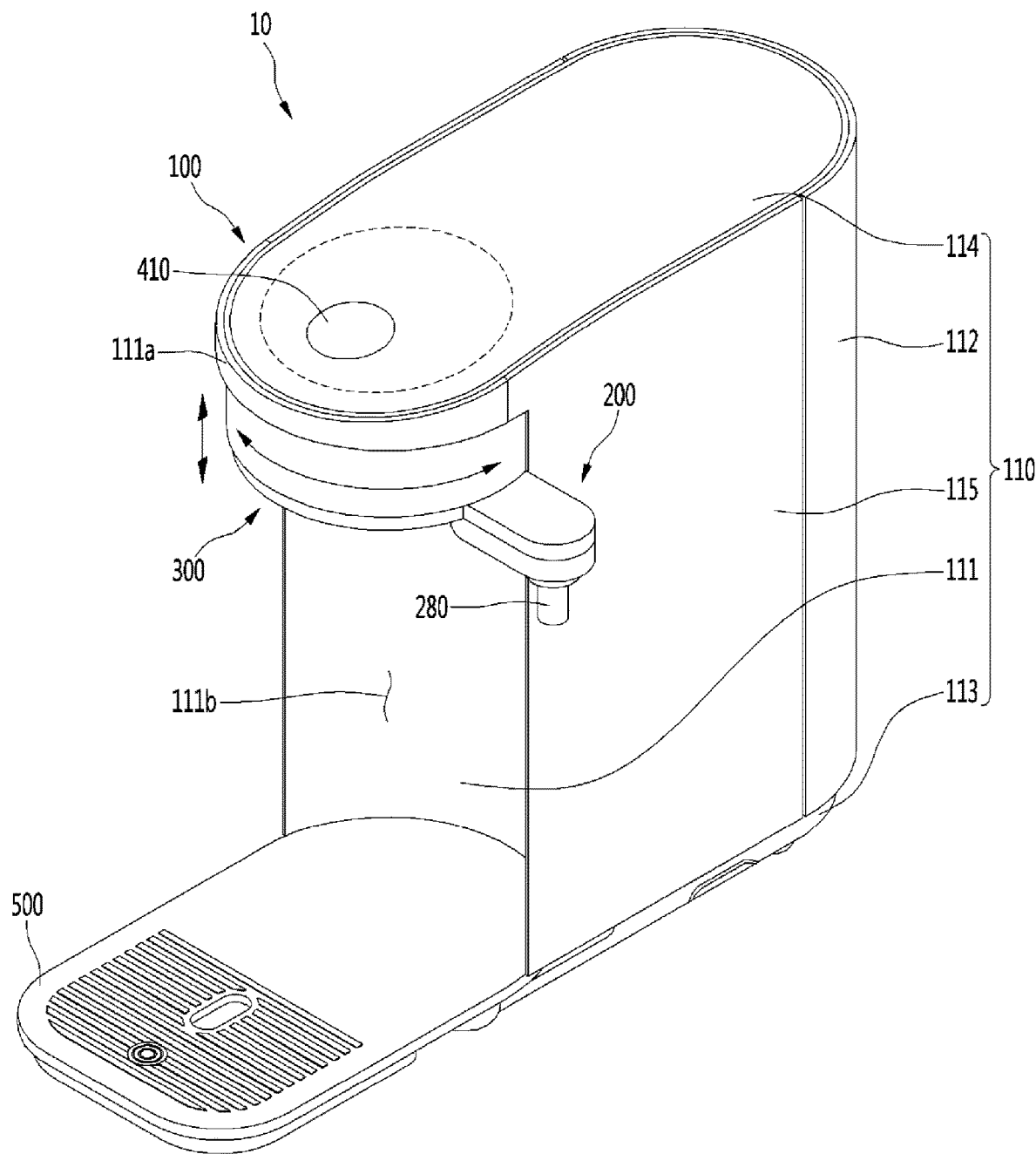
FIG. 2 is a perspective view illustrating a state in which a water discharge nozzle of the water purifier is changed in position according to an embodiment.

FIG. 1 is a perspective view of a water purifier according to an embodiment. Also, FIG. 2 is a perspective view illustrating a state in which a water discharge nozzle of the water purifier is changed in position according to an embodiment.

As illustrated in the drawings, a water purifier 10 according to an embodiment has a length that is long in a front and rear direction, and thus the water purifier 10 has a narrow width in a left and right direction. Thus, the water purifier 10 has a slim and compact outer appearance on the whole.

Also, the water purifier 10 according to an embodiment may include a water purifier body 100 and a water discharge module (or dispenser) 200 mounted to be elevatably in a vertical direction with respect to the water purifier body 100 or mounted to be rotatable in a horizontal direction by a rotator (also referred to as a rotator plate or rotator ring) 300.

The water purifier body 100 includes a housing 110 and a filter (not shown). The outer appearance of the water purifier 10 may be defined by the housing 110. The housing 110 includes a front cover 111 defining an outer appearance of a front surface, a rear cover 112 defining an outer appearance of a rear surface, a base 113 defining a bottom surface, a top cover 114 defining a top surface, and side panels 115 defining both left and right surfaces. The front cover 111, the rear cover 112, the base 113, the top cover 114, and the pair of side panels 115 may be assembled with each other to constitute the outer appearance of the water purifier 10. The filter (not shown) for purifying raw water introduced from the outside to discharge the purified water is provided in the housing 110.

The water discharge module 200 is provided on the front surface of the water purifier body 100. The water discharge module 200 may protrude forward from the front cover 111 to dispense the purified water through a water discharge nozzle 280 that protrudes downward.

Also, the front cover 111 may be recessed backward. Thus, an elevation space 111b of the water discharge module 200 may be provided below the water discharge module 200. The elevation operation of the water discharge module 200 may be enabled due to the configuration of the elevation space 111b as described above. Also, the front cover 111 may further include an upper cover 111a.

The upper cover 111a may extend downward from a front end of the top cover 114 and have a shape that protrudes forward. The upper cover 111a may have an opened lower portion in which a portion of the water discharge module 200 that will be described later is accommodated.

The water discharge module 200 may protrude to a lower side of the upper cover 111a in a state in which an upper portion of the water discharge module 200 is accommodated in the upper cover 111a. For example, a water discharge nozzle 280 is fixed to a rotator 300 of the water discharge module 200, and the rotator 300 is elevated while being supported by and coming into contact with the upper cover 111a.

Also, upper ends of the upper cover 111a and the front cover 111 are provided with a circular inner space in which the circular rotator 300 is accommodated. The rotator 300 is rotatably mounted on a movable frame 220 that will be described later and is rotatable and elevatably by the front cover 111 that is recessed backward.

As described above, the water discharge module 200 is rotatable by the rotator 300. Thus, the user may rotate the water discharge module 200 at a desired angle according to an installation state or installation environment of the water purifier 10.

For example, a manipulation part (or manipulation layer) 400 including a water discharge button 410 may be provided on the front of the top cover 114, and the manipulation part 400 may have a structure that is rotatable together with the water discharge module 200. For another example, the manipulation part 400 may not be provided on the water purifier body 100 but be provided on the water discharge module 200.

In this case, the water discharge button 410 of the manipulation part 400 may be provided on a top surface of the water discharge module 200. If the water discharge button 410 is provided on the front surface of the water discharge module 200, when the user pushes the water discharge button 410, force in the horizontal direction may be applied to the water discharge module to allow the water discharge module 200 to be arbitrarily rotated. On the other hand, if the water discharge button 410 is provided on the top surface of the water discharge module 200, when the user pushes the water discharge button 410, force in the vertical direction may be applied to the water discharge module to prevent the water discharge module 200 from being arbitrarily rotated. Thus, when the water discharge button 410 is provided on the water discharge module 200, the water discharge button 410 has to be provided on the top surface of the water discharge module 200. For another example, the manipulation part 400 may be provided on the top cover 114 of the water purifier body 100 and all both sides of the top surface of the water discharge module 200.

Also, the water discharge module 200 includes an elevation unit by which the water discharge nozzle 280 varies in height. The water discharge nozzle 280 may vary in height due to the above-described elevation unit.

In addition, the water discharge module 200 includes a rotator 300 that rotates the water discharge nozzle 280. The water discharge nozzle 280 may be rotated in a direction of both the sides due to the above-described rotator 300. The above-described rotation and elevation operations of the water discharge module 200 will be described later.

Figure 3:
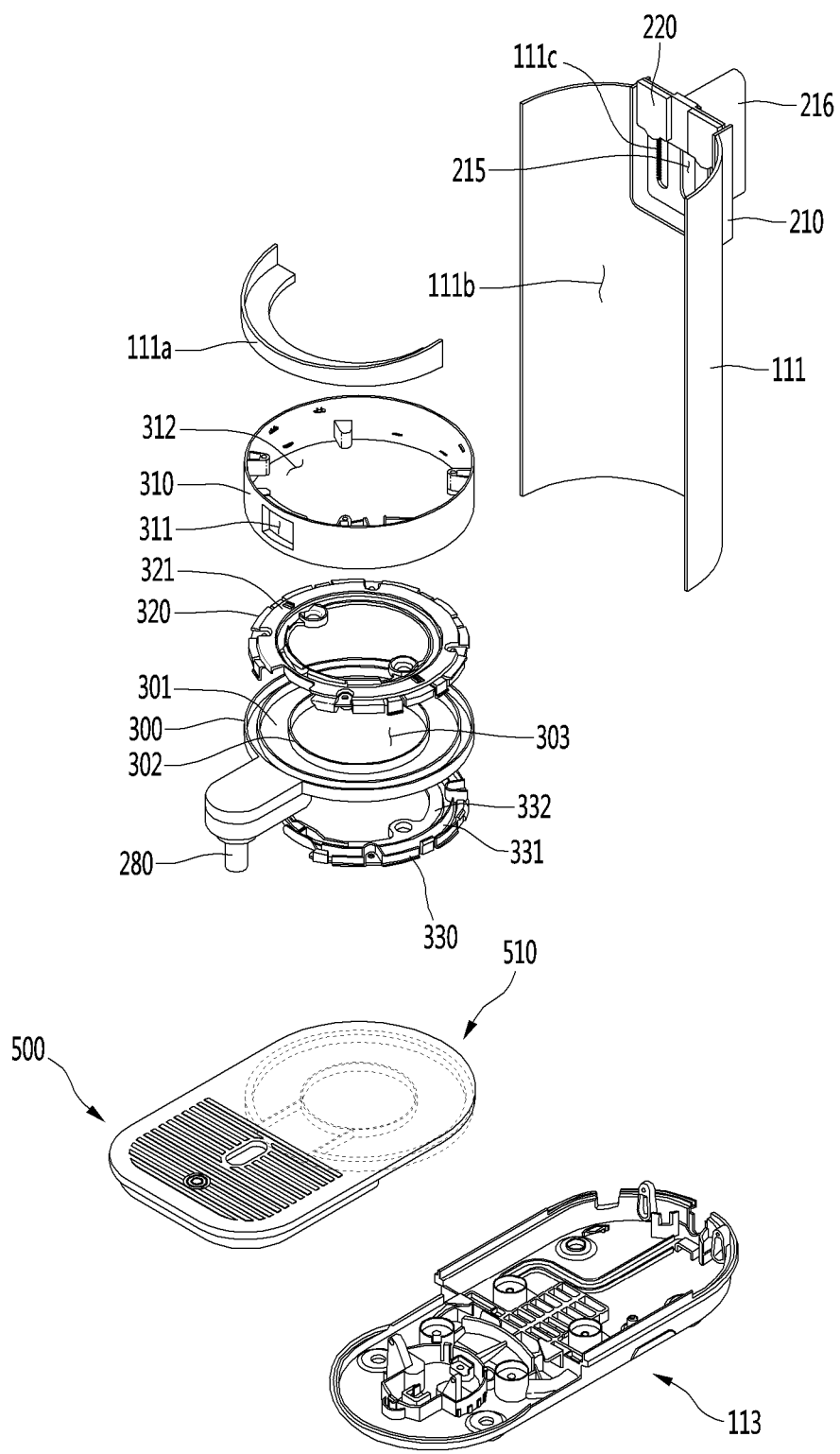
FIG. 3 is an exploded perspective view illustrating a portion of the water purifier according to an embodiment.

FIG. 3 is an exploded perspective view illustrating a portion of the water purifier 10 according to an embodiment. Hereinafter, main components of the water purifier 10 will be described in more detail with reference to the accompanying drawings.

The water discharge module 200 includes the elevation unit (or elevation assembly) elevatably mounted on the water purifier body 100 to elevate the water discharge nozzle 280 in the vertical direction with respect to the water purifier body 100 and the rotator 300 rotatably mounted to rotate the water discharge nozzle 280 in the direction of both the sides with respect to the water purifier body 100. Here, the elevation unit and the rotator 300 may be integrated with each other and also separably coupled to each other.

Here, the 'elevation unit' will be described. As described above, the elevation unit is elevatably mounted on an upper portion of the front cover 111 defining the front surface of the water purifier body 100 and is elevated with respect to the water purifier body 100 to allow the water discharge nozzle 280 to vary in height.

In detail, the elevation unit includes a fixed frame 210 fixed to the front upper end of the water purifier body 100, a movable frame 220 to which the rotator 300 and the water discharge nozzle 280 are fixed, which is elevatably coupled to the fixed frame 210, and which allows the rotator 300 and the water discharge nozzle 280 to vary in height, and a resistance unit 230 provided on the fixed frame 210 or the movable frame 220 to reduce elevation force applied to the movable frame 220 so that the movable frame 220 ascends or descends.

The fixed frame 210 is detachably fixed to the upper portion of the front cover 111 to support the movable frame 220 so that the movable frame 220 is elevated in the state of being fixed to the water purifier body 100. Thus, the movable frame 220 may be elevated in the state of being supported on the water purifier 10 by the fixed frame 210.

Here, a mounting groove 111c that is cut to be recessed downward from an upper side may be defined in the upper end of the front cover 111, and the fixed frame 210 may be mounted on the mounting groove 111c. For example, the fixed frame 210 may define a sidewall protruding forward from both sides of a front surface thereof to provide an elevation space 211, and the movable frame 220 may be elevated in a state of being accommodated in the elevation space of the fixed frame 210.

Also, the fixed frame 210 and the movable frame 220 may have a protrusion part (or protrusion) and a groove part (or groove) at positions corresponding to each other in the elevation direction of the movable frame 220, respectively. Thus, straight movement of the movable frame 220 may be guided while coupling force between the fixed frame 210 and the movable frame 220 increases.

Here, when the groove part is provided in the fixed frame 210, the protrusion part inserted into the groove part may be provided on the movable frame 220. On the other hand, when the protrusion part is provided on the fixed frame 210, the groove part into which the protrusion part is inserted may be provided in the movable frame 220.

In addition, a hook part (or hook surface) 213 protruding forward may be provided on the front upper or lower end of the fixed frame 210. When the above-described hook part 213 is provided, the movable frame 220 may be limited in maximally increasing and decreasing heights.

The resistance unit 230 may be provided on the fixed frame 210 or the movable frame 220. The resistance unit 230 may reduce the elevation force applied to the movable frame 220 to allow the movable frame 220 to ascend or descend. Here, 'the elevation force applied to the movable frame 220' may mean all force having an influence on the elevation operation of the movable frame 220.

For example, the elevation force may be force for pulling the rotator 300 and the water discharge nozzle 280, which are connected to the movable frame 220, downward so that the user moves the movable frame 220 downward and force for pushing the rotator 300 and the water discharge nozzle 280, which are connected to the movable frame 220, upward so that the user moves the movable frame 220 upward. In addition, the elevation force may be force for allowing the rotator 300 and the water discharge nozzle 280, which are connected to the movable frame 220, to descend.

As described above, when the movable frame 220 ascends with respect to the fixed frame 210, the movable frame 220 and the rotator 300 and the water discharge nozzle 280, which are connected to the movable frame 220, may arbitrarily descend by self-weight thereof. In addition, in the state in which the user holds and moves the rotator 300 and the water discharge nozzle 280, which are connected to the movable frame 220, downward up to a desired position, when the user's hand is separated, the movable frame 220 and the rotator 300 and the water discharge nozzle 280, which are connected to the movable frame 220, may not be fixed at their position but further descends arbitrarily by the self-weight. That is, it is difficult to maintain the heights of the movable frame 220 and the rotator 300 and the water discharge nozzle 280, which are connected to the movable frame 220.

According to an embodiment, to prevent this phenomenon, the resistance unit 230 is provided on the fixed frame 210 or the movable frame 220. The resistance unit 230 may reduce the elevation force applied to the movable frame 220 to allow the rotator 300 and the water discharge nozzle 280, which are connected to the movable frame 220, to ascend or descend.

Thus, in the state in which the user holds and moves the rotator 300 and the water discharge nozzle 280, which are connected to the movable frame 220, downward up to a desired position, even though the user's hand is separated, the movable frame 220 and the rotator 300 and the water discharge nozzle 280, which are connected to the movable frame 220, may be fixed at their positions. Thus, the water discharge nozzle 280 may be provided at a height that is desired by the user to dispense water.

Here, the resistance unit 230 may be selected within a range in which the user does not exert excessive force on the elevation operation of the movable frame 220 and the rotator 300 and the water discharge nozzle 280, which are connected to the movable frame 220, while preventing the movable frame 220 and the rotator 300 and the water discharge nozzle 280, which are connected to the movable frame 220, from descending by the self-weight. In addition, the resistance unit 230 may be selected within a range in which the user feels improvement of the operational sensitivity of elevating the movable frame 220 and the rotator 300 and the water discharge nozzle 280, which are connected to the movable frame 220.

For example, the resistance unit 230 may be made of a rubber material having friction force and an oil material having viscosity. Alternatively, the resistance unit 230 may be variously adopted within a range in which the elevation force applied to the movable frame 220 is reduced. An example of the resistance unit 230 will be described below in detail.

Also, the water discharge nozzle 280 may be made of a stainless steel material. As described above, when the water discharge nozzle 280 is made of the stainless steel material, the water discharge nozzle 280 may be hygienic because it does not rust and prevent damage and deformation from being occurring due to the frequent use. Also, the water purifier 10 may be elegant in outer appearance and also additionally realize a luxurious image. Also, the water discharge nozzle 280 may be integrated with a separate connection member connecting the movable frame 220 to the water discharge nozzle 280 or the rotator 300 through an insert injection manner.

Figure 4:
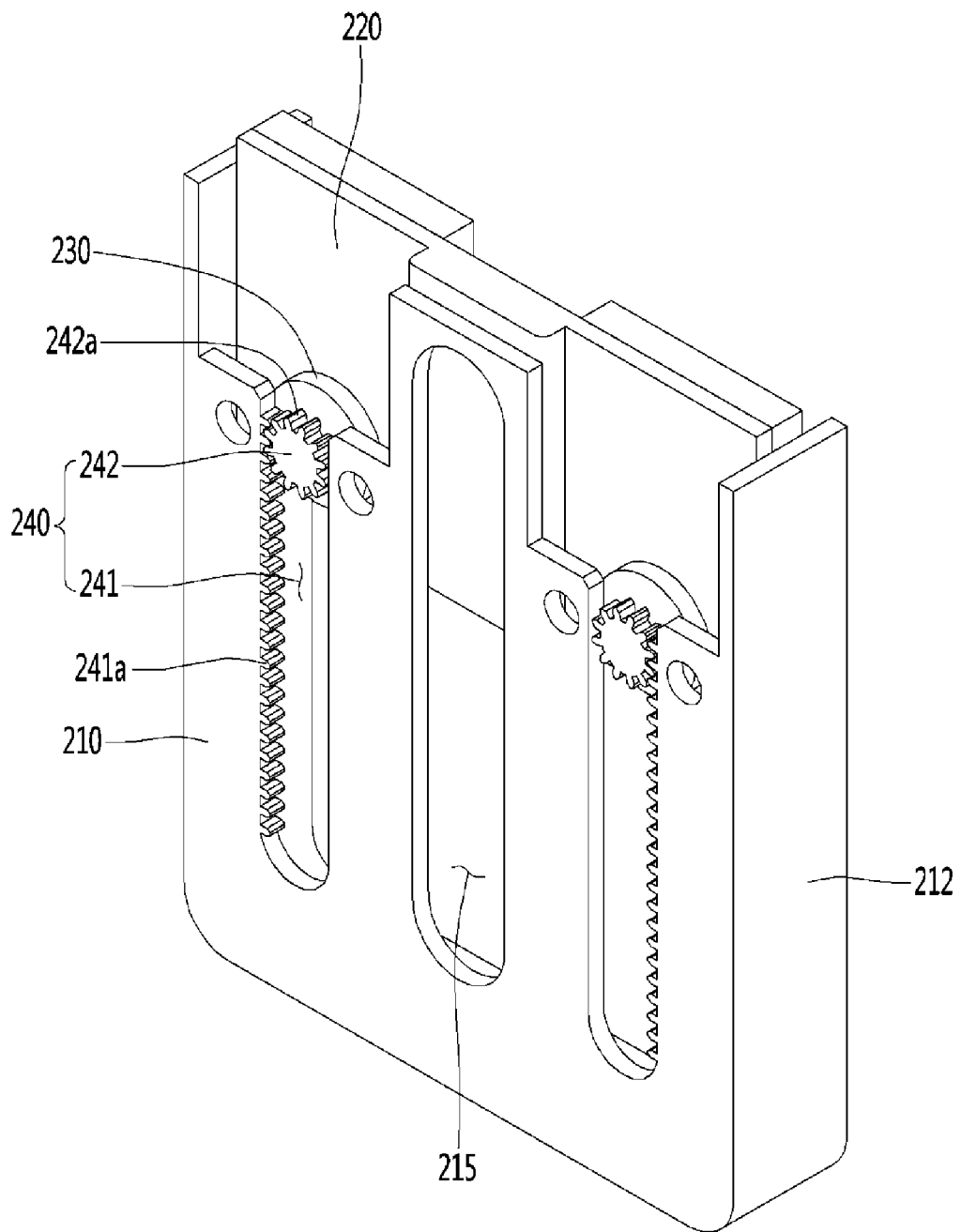
FIG. 4 is a rear perspective view illustrating a state in which a movable frame of a water discharge module, which is a portion of components according to an embodiment, ascends.
Figure 5:
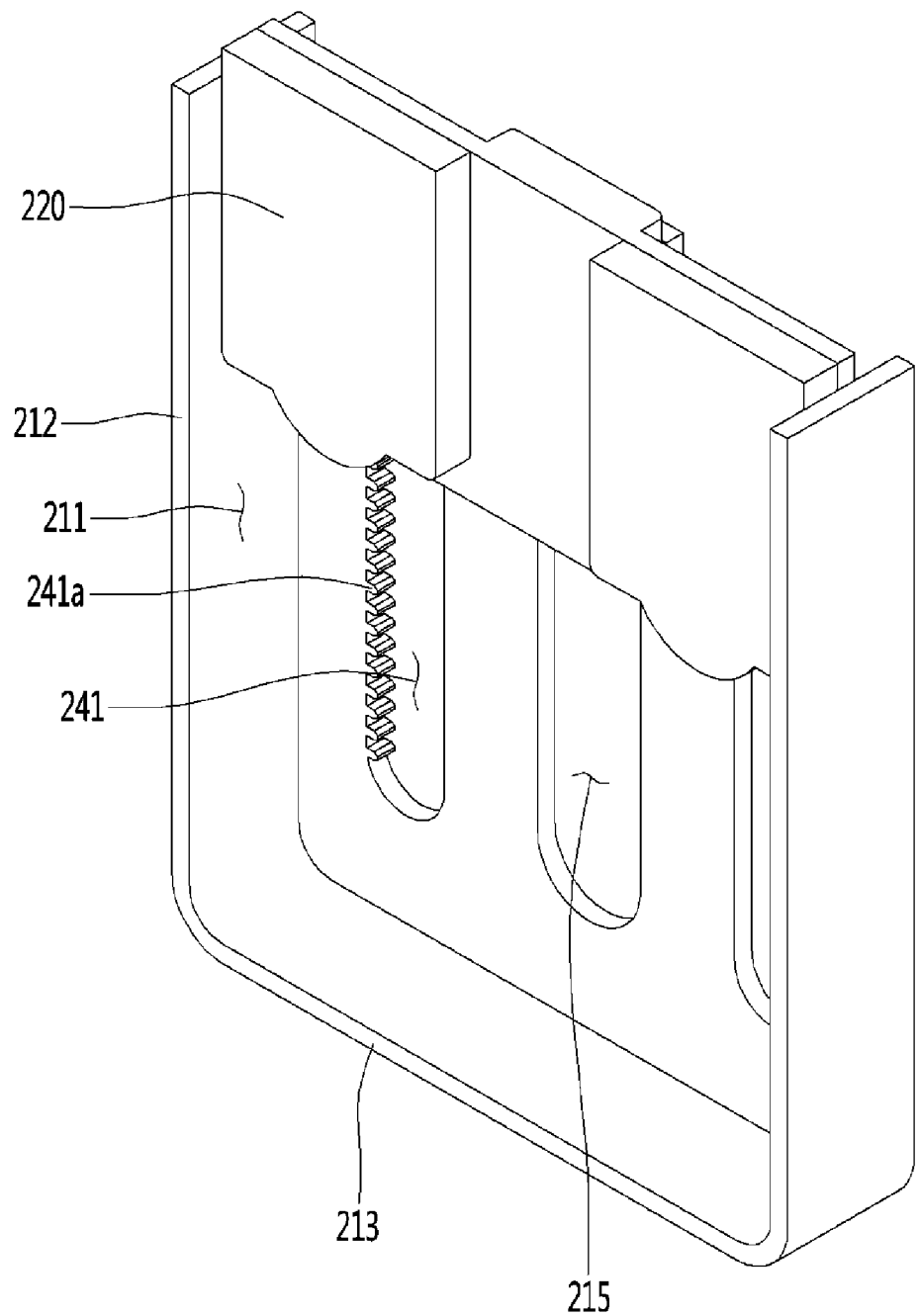
FIG. 5 is a front perspective view illustrating a state in which the movable frame of the water discharge module, which is a portion of the components according to an embodiment, ascends.
Figure 6:
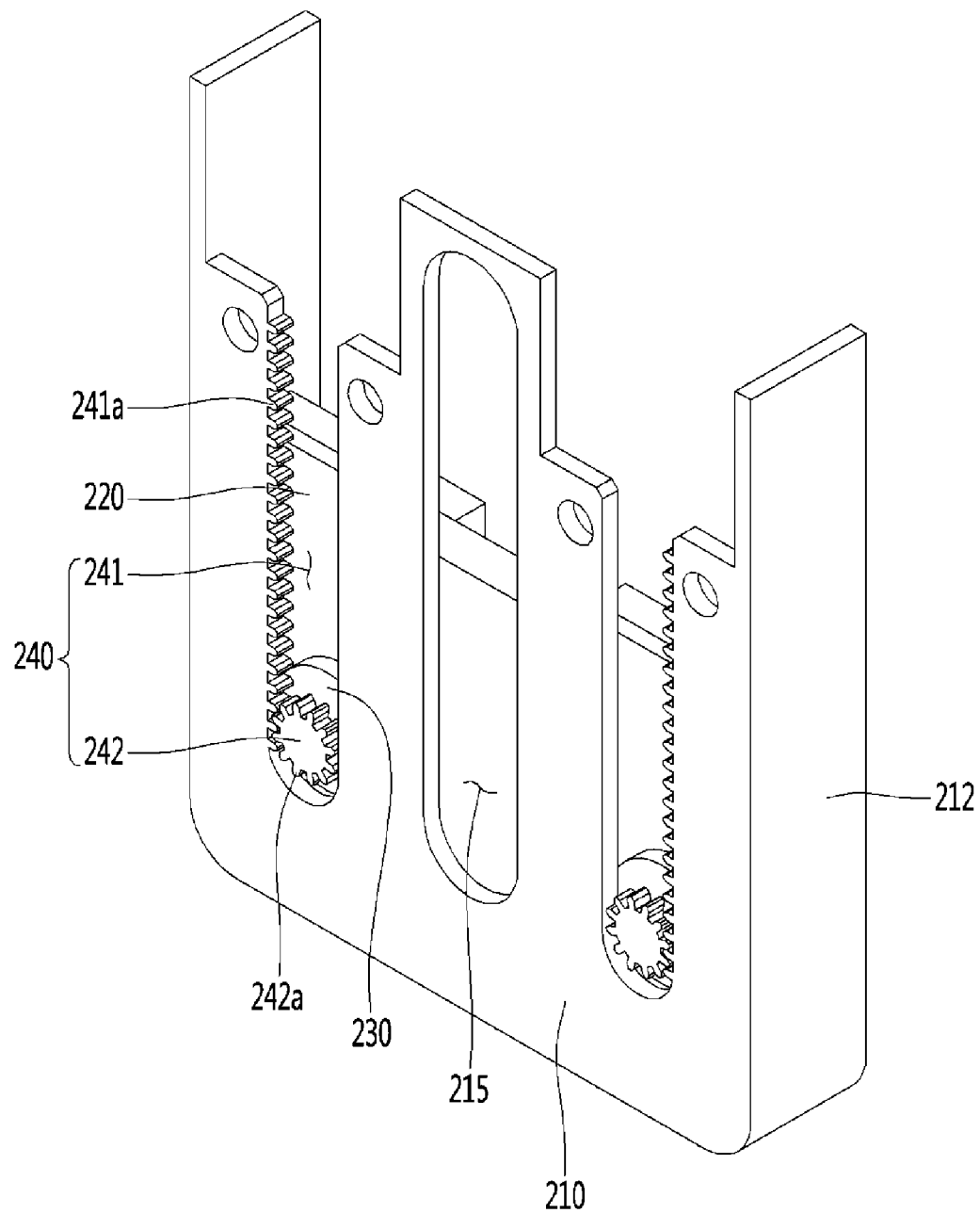
FIG. 6 is a rear perspective view illustrating a state in which the movable frame of the water discharge module, which is a portion of the components according to an embodiment, descends.
Figure 7:
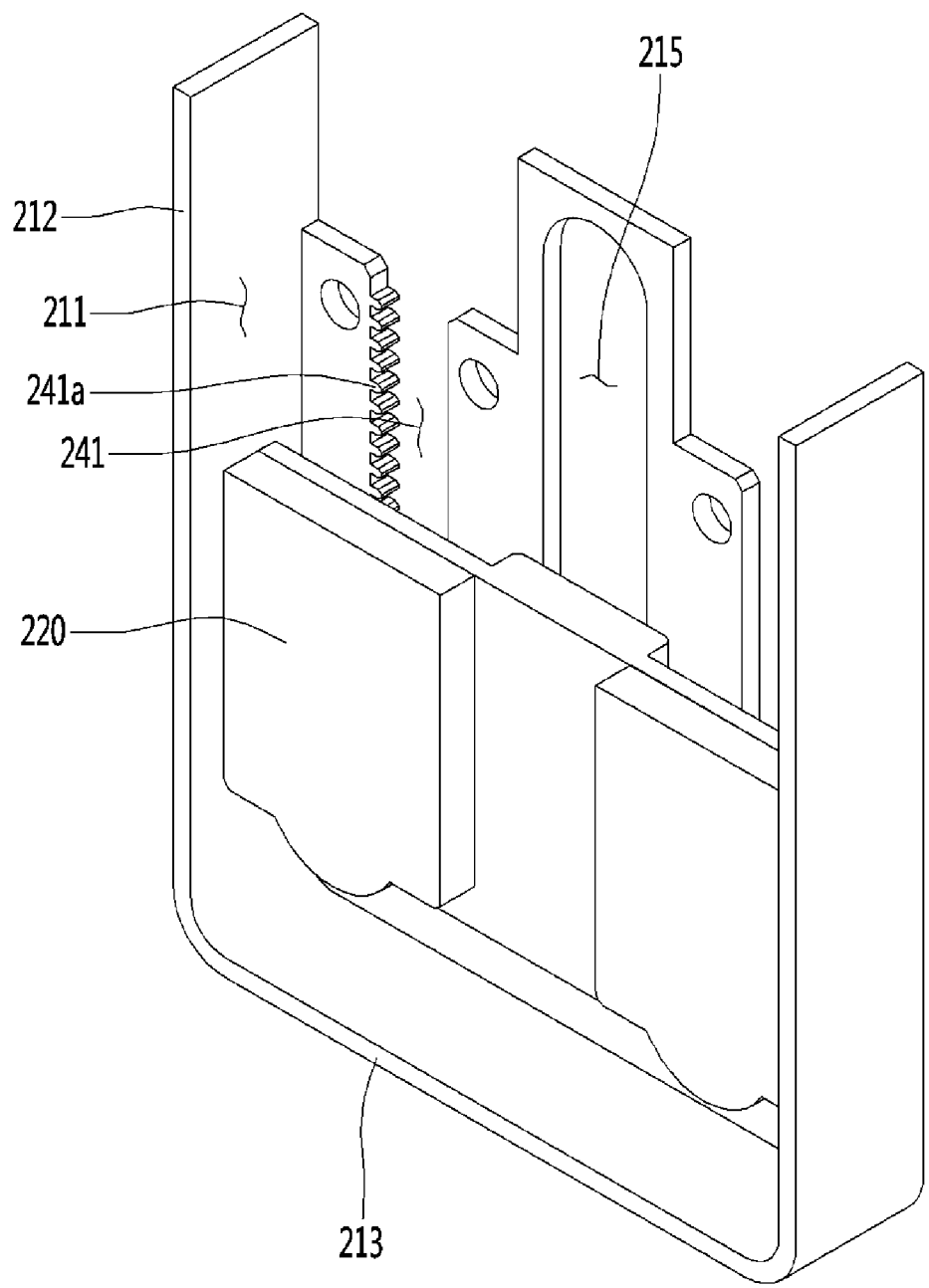
FIG. 7 is a front perspective view illustrating a state in which the movable frame of the water discharge module, which is a portion of the components according to an embodiment, descends.

FIG. 4 is a rear perspective view illustrating a state in which a movable frame of a water discharge module, which is a portion of components according to an embodiment, ascends, FIG. 5 is a front perspective view illustrating a state in which the movable frame of the water discharge module, which is a portion of the components according to an embodiment, ascends, FIG. 6 is a rear perspective view illustrating a state in which the movable frame of the water discharge module, which is a portion of the components according to an embodiment, descends, and FIG. 7 is a front perspective view illustrating a state in which the movable frame of the water discharge module, which is a portion of the components according to an embodiment, descends.

Referring to FIGS. 4 to 7, a guide part 240 (or guide) for guiding the movable frame 220 to be straightly elevated may be provided on the fixed frame 210 or the movable frame 220. If the movable frame 220 is not straightly elevated, the elevation operation of the movable frame 220 may be unstable. When this phenomenon is repeated, the fixed frame 210 or the movable frame 220 may be deformed and damaged, and also, the operational sensitivity for the user may be deteriorated. According to this embodiment, to prevent this phenomenon from occurring, the separate guide part 240 is provided.

The guide part 240 may be variously adopted within a range in which the guide part 240 guides the straight elevation of the movable frame 220 while the movable frame 220 is supported by the fixed frame 210. For example, the guide part 240 may include a straight rail vertically provided on the fixed frame 210 and a traveling part provided on the movable frame 220 to travel along the straight rail.

Alternatively, the guide part 240 may include a straight rail vertically provided on the fixed frame 210 and a roller provided on the fixed frame 210 to travel along the straight rail. Alternatively, the guide part 240 may include a guide groove 241 defined in the fixed frame 210 in the elevation direction and a guide piece (or guide wheel) 242 provided on the movable frame 220 and inserted into the guide groove 241. Alternatively, the guide part 240 may include a guide groove defined in the movable frame 220 in the elevation direction and a guide piece provided on the fixed frame 210 and inserted into the guide groove.

Here, the guide piece 242 may be inserted into the guide groove 241 having a linear shape to straightly move along the guide groove 241. Thus, the movable frame 220 may be straightly elevated.

Also, at least two or more guide grooves 241 may be provided in parallel to each other. For example, the guide groove 241 may be provided on both sides of the fixed frame 210 so as to be provided on both sides with respect to a center of the front cover 111.

For another example, the guide groove 241 may be provided at a center of the front cover 111, at a center of the fixed frame 210 so as to be provided on both sides the center, and on both sides of the center. Also, the guide piece 242 may be rotatably mounted on the movable frame 220.

As described above, when the guide piece 242 is rotatably mounted on the movable frame 220, friction force between the guide piece 242 and the guide groove 241 may be minimized, and then, the movable case 220 may be straightly elevated along the guide groove 241. Thus, the movable frame 220 may be smoothly elevated, and the user may feel the improved operational sensitivity.

Also, first gear teeth 241a may be provided inside the guide groove 241, and second gear teeth 242a engaged with the first gear teeth 241a may be provided on an outer circumferential surface of the guide piece 242. That is, the guide groove 241 and the guide piece 242 may be engaged with each other in a rack and pinion manner. The guide piece 242 may be straightly elevated along the guide groove 241 while rotating.

For example, when the user pulls the movable frame 220 and the rotator 300 and the water discharge nozzle 280, which are connected to the movable frame 220, downward, the guide piece 242 is rotated to descend along the guide groove 241 in the state in which the gear teeth 241a and 242a are engaged with each other. On the other hand, when the user pushes the movable frame 220 upward, the guide piece 242 is rotated in a direction different from that when the guide piece 242 descends to ascend along the guide groove 241 in the state in which the gear teeth 241a and 242a are engaged with each other.

As described above, when the gear teeth 241a and 242a are provided, since the gear teeth 241a and 242a are engaged with each other, the guide piece 242 may be more accurately straight elevated along the guide groove 241 while rotating. As a result, the movable frame 220 may be more accurately straightly elevated. Also, to prevent the guide piece 242 from idling in the guide groove 241, the movable frame 220 may be accurately elevated to a height that is desired by the user.

Also, the first gear teeth 241a or the second gear teeth 242a may include a linear section or a curved section, which has a shape that is perpendicular to or inclined in the elevation direction of the movable frame 220. Particularly, a portion or the whole of the first gear teeth 241a or the second gear teeth 242a may be curved.

As described above, when each of the first gear teeth 241a or the second gear teeth 242a has a curved shape, the first gear teeth 241a and the second gear teeth 242a may be smoothly engaged with each other to allow the user to feel the improved operational sensitivity. Also, while the user holds the movable frame 220 to elevate the movable frame 220, the first gear teeth 241a or the second gear teeth 241b may be prevented from being damaged by force applied to the first gear teeth 241a or the second gear teeth 241b.

If each of the first gear teeth 241a or the second gear teeth 241b has a straight shape to provide a sharp corner, the force may be concentrated into the sharp corner to damage the sharp corner. For example, each of the first gear teeth 241a or the second gear teeth 241b may have an uneven portion that protrudes or is recessed in a semicircular shape.

In addition, each of the first gear teeth 241a or the second gear teeth 241b may have various shapes so that the second gear teeth 242a are engaged with the first gear teeth 241a to securely transmit power, and the guide piece 242 straightly moves along the guide groove 241.

Also, the resistance unit 230 may be provided as an oil damper. The oil damper may mean a device in which an oil is provided in the housing to absorb energy through viscosity resistance of the oil.

As described above, the oil damper may include, for example, a cylindrical housing, an oil filled into the housing and having predetermined viscosity, a rotation blade having a plurality of through-holes, through which the oil passes, and provided in parallel to a radial direction of the housing, and a rotation shaft connected to the rotation blade. Thus, when rotation force is supplied to the rotation shaft, the rotation force may be reduced by the viscosity resistance of the oil.

Figure 8:
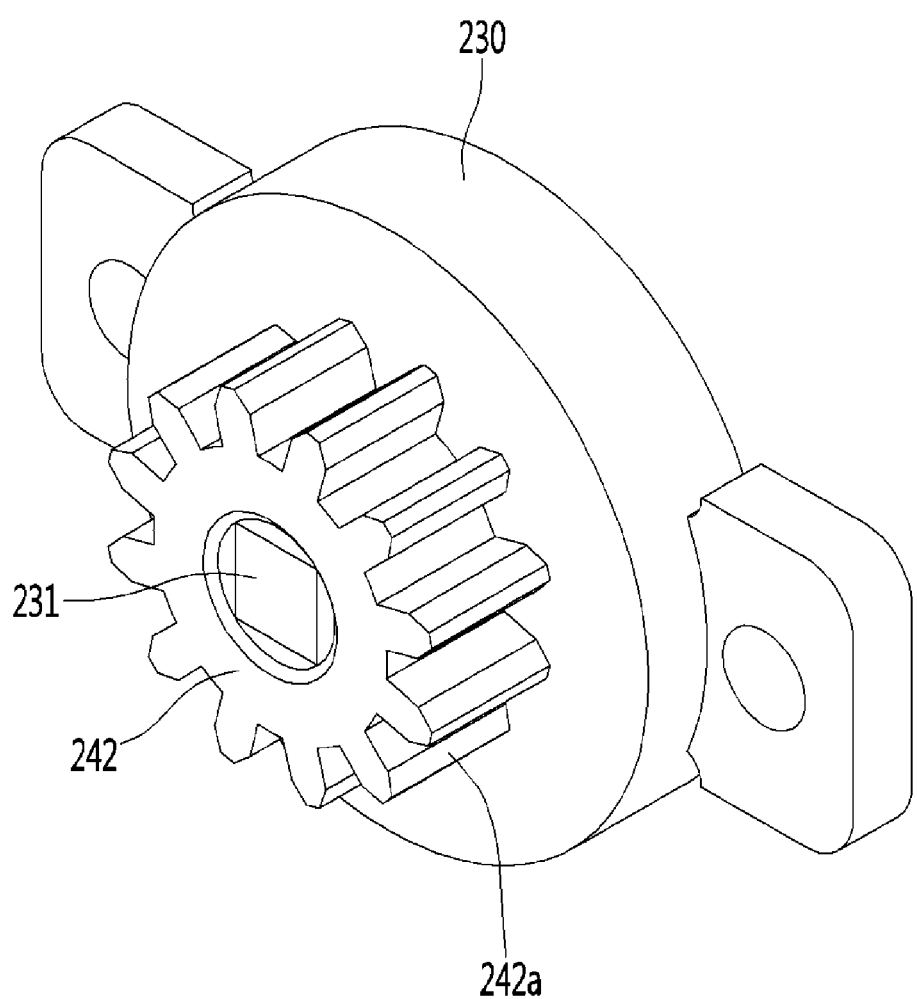
FIG. 8 is a perspective view illustrating a state in which a resistance member and a guide piece, which are portions of the components according to an embodiment, are connected to each other.

FIG. 8 is a perspective view illustrating a state in which the resistance member and the guide piece, which are portions of the components, are connected to each other according to an embodiment. As illustrated in FIG. 8, the resistance unit 230 may be provided as the oil damper, and the guide piece 242 may be connected to the rotation shaft 231 of the resistance unit 230.

That is, when the elevation force is applied to the movable frame 220 so that the movable frame 220 and the rotator 300 and the water discharge nozzle 280, which are connected to the movable frame 220, ascend or descend, the guide piece 242 rotatably connected to the movable frame 220 is rotated. Here, the rotation force of the guide piece 242 is reduced by the resistance unit 230, i.e., the oil damper.

Thus, in the state in which the movable frame 220 ascends, the movable frame 220 may not arbitrarily descend but be maintained in the ascending state by viscosity resistance of the resistance unit 230. Thus, in the state in which the user holds and moves movable frame 220 and the rotator 300 and the water discharge nozzle 280, which are connected to the movable frame 220, downward up to a desired position, even though the user's hand is separated, the movable frame 220 and the rotator 300 and the water discharge nozzle 280, which are connected to the movable frame 220, may be fixed at the desired positions by the viscosity resistance of the resistance unit 230.

Here, an oil viscosity of the oil damper may be variously adjusted within a range in which the user does not exert excessive force on the elevation operation of the movable frame 220 and the rotator 300 and the water discharge nozzle 280, which are connected to the movable frame 220, while preventing the movable frame 220 from descending by the self-weight thereof. Also, the oil viscosity of the oil damper may be variously adjusted within a range in which the user feels the improved operational sensitivity.

For another example, the fixed frame 210 and the movable frame 220 may come into line contact with each other. Here, the 'line contact' may mean a point contact between the fixed frame 210 and the movable frame 220 with respect to a transverse cross-section. That is, the point contact is continuously connected in the elevation direction of the movable frame 220 to form a line-shaped contact between the fixed frame 210 and the movable frame 220 along the elevation direction of the movable frame 220. For this, at least one or more contact protrusions 216 may be provided on the fixed frame 210 or the movable frame 220 in the elevation direction of the movable frame 220 (see FIG. 3).

Also, at least one of the fixed frame 210 and the movable frame 220 may be made of an engineering plastic material having superior fatigue resistance, toughness, and abrasion resistance and lubricity. For example, at least one of the fixed frame 210 and the movable frame 220 may be made of a polyoxymethylene (POM) material. Thus, when the movable frame 220 ascends, abrasion and noise due to the friction between the fixed frame 210 and the movable frame 220 may be reduced.

In addition, the movable frame 220, the rotator 300 connected to the movable frame 220, and the upper cover 111a and the front cover in which at least a portion of the rotator 300 is accommodated may be made of the engineering plastic material. Thus, when the user pulls the movable frame 220 and the rotator 300 and the water discharge nozzle 280, which are connected to the movable frame 220, downward to descend, or when the rotator 300 and the water discharge nozzle 280, which are moved downward, ascend, the elevation operation of the rotator 300 and the water discharge nozzle 280 may be smoothly performed to improve the operational sensitivity.

The rotator 300 may be rotatably mounted on the elevation unit to rotate with respect to the elevation unit so that the water discharge nozzle 280 varies in position. Hereinafter, the 'rotator 300' will be described.

Referring again to FIG. 3, the rotator 300 has a circular shape, and the water discharge nozzle 280 protrudes forward from the rotator 300. The water discharge nozzle 280 may be integrated with the rotator 300 or be separably provided and then coupled to the rotator 300. Here, when the rotator 300 is rotated, the water discharge nozzle 280 may be rotated together with the rotator 300.

The upper cover 111a may be provided above the rotator 300. The upper cover 111a may define a portion of the outer appearance of the front surface of the water purifier between the rotator 300 and the top cover 114 and be rounded. An upper end of the rotator 300 may be accommodated in the upper cover 111a.

The rotator 300 is rotatably connected to the movable frame 220. For example, the rotator 300 may include a non-rotation member fixed to the movable frame 220 and elevated together with the movable frame 220 and a rotation member rotatably mounted on an upper end or lower end of the non-rotation member and rotated with respect to the non-rotation member.

Thus, the rotation member may be elevatable and rotatable, and the water discharge nozzle 280 may be mounted on the rotation member and thus elevated and rotated together with the rotation member. Here, the non-rotation member may correspond to a rotator housing 310 and guide brackets 320 and 330, which are described later, and the rotation member may correspond to the rotator 300.

For example, the rotator housing 310 may be injection-molded to be integrated with the movable frame 220. For another example, the rotator housing 310 may be separately manufactured with respect to the movable frame 220 and then be integrally coupled to the movable frame 220 through an adhesion unit such as an adhesive and an adhesion sheet and a coupling unit such as a bolt and nut or a screw.

For another example, a groove or a protrusion may be respectively provided in or on portions coming into contact with the rotator housing 310 and the movable frame 220 and then be coupled to each other. In addition, various embodiments may be adopted to the coupling method between the rotator housing 310 and the movable frame 220 in a range in which the rotator housing 310 and the movable frame 220 are integrally coupled to each other so that the rotator housing 310 and the movable frame 220 are elevated at the same time.

The top cover 114 may be provided on the upper end of the upper cover 111a (see FIGS. 1 and 2). The top cover 114 defines a top surface of the water purifier 10.

For example, the manipulation part 400 is mounted on the top cover 114. The manipulation part 400 may be provided on an upper portion of the water discharge nozzle 280. Also, the top surface of the manipulation part 400 may have an inclined surface that is inclined downward toward a side that is close to the water discharge nozzle 280. Thus, the manipulation of the manipulation part 400 may be improved, and also, the user's operation convenience and recognition may be improved. Also, the water discharge button 410 is provided on the manipulation part 400.

Also, the manipulation part 400 may be provided in a fixed type so that the manipulation part 400 is fixed regardless of the rotation of the rotator 300 or be provided in rotation type so that the manipulation part 400 is interlocked with the rotation of the rotator 300. In the case of the rotation type, the manipulation part 400 has a circular shape and is coupled to the rotator 300 through a separate coupling unit so as to be rotated together with the rotator 300 when the rotator 300 is rotated.

Referring again to FIG. 3, the rotator 300 is provided with the rotator housing 310. The rotator housing 310 is coupled to the movable frame 220 and has a hollow part 312 having opened upper and lower portions. The rotator housing 310 is elevated along the movable frame 220.

Also, the rotator 300 is provided with an upper guide bracket 320 and a lower guide bracket 330, which are provided to be spaced apart from inner upper and lower portions of the rotator housing 310. The rotator 300 is rotatably mounted on the rotator housing 310 or the guide brackets 320 and 330.

For this, rotation guide protrusions 321 and 331 that are inserted into a circular rotation guide groove 301 defined along a circumferential direction in a top or bottom surface of the rotator 300 may be provided on the guide brackets 320 and 330, or a rotation guide groove 332 into which rotation guide protrusion 302 provided along the circumferential direction on the top or bottom surface of the rotator 300 is inserted may be defined in the guide brackets 320 and 330. Thus, the rotator 300 may be rotated in a circumferential direction of the rotator housing 310 or the guide brackets 320 and 330.

Here, the rotation guide protrusions 321 and 331 or the rotation guide groove 332, which are provided on or in the guide brackets 320 and 330, may be made of the same material as the rotation guide groove 301 or the rotation guide protrusion 302, which are provided in or on the rotator 300. For example, the rotation guide protrusion may be made of engineering plastic (POM) having superior fatigue resistance, toughness, abrasion resistance, and the like. Thus, when the rotation guide protrusion is rotated along the rotation guide groove, abrasion and noise due to friction between the rotation guide protrusion and the rotation guide rail may be reduced.

Communication holes 311 and 215 through which a water discharge tube and a hot water tube (not shown) pass may be defined in a connection portion between the rotator housing 310 and the fixed frame 210, respectively. Also, the fixed frame 210 may extend backward to provide a guide tube (e.g., in the protrusion 216) that guides the water discharge tube and the hot water tube (not shown) to the communication hole 215.

The water discharge tube and the hot water tube (not shown) may be connected to the water discharge nozzle 280 through the communication holes 311 and 215. According to this embodiment, the separate hot water tube may be connected to the water discharge nozzle 280 to supply hot water within a hot water tank to the water discharge nozzle 280 without temperature loss.

Also, the rotator 300 may have a hollow part 303. Thus, the water discharge tube and the hot water tube (not shown) may be connected to the water discharge nozzle 280 through the hollow part 303.

The oil damper (not shown) may be provided on the bottom or top surface of the rotator 300. The oil damper may allow the rotator 300 to be smoothly rotated without hung feeling when the rotator 300 is rotated. Thus, the rotator may be rotated at a consent rate so long as predetermined force is applied to the rotator 300.

The oil damper (not shown) may have a general structure that is used to maintain the constant rotation rate, and thus, its detailed description will be omitted. Also, a pinion gear may be coupled to a rotation shaft of the oil damper (not shown). The pinion gear is engaged with an internal gear provided along the circumferential direction of the rotator housing 310 or the guide brackets 320 and 330 and thus is moved along the internal gear.

The pinion gear may have a circular shape having a curvature radius significantly less than that of the internal gear, and the number of teeth of the pinion gear may be less than that of teeth of the internal gear. According to the above-described coupling structure, the rotator 300 and the water discharge nozzle 280 connected to the rotator 300 may be stably rotated, and thus, the water discharge nozzle 280 may be freely changed in position.

Figure 9:
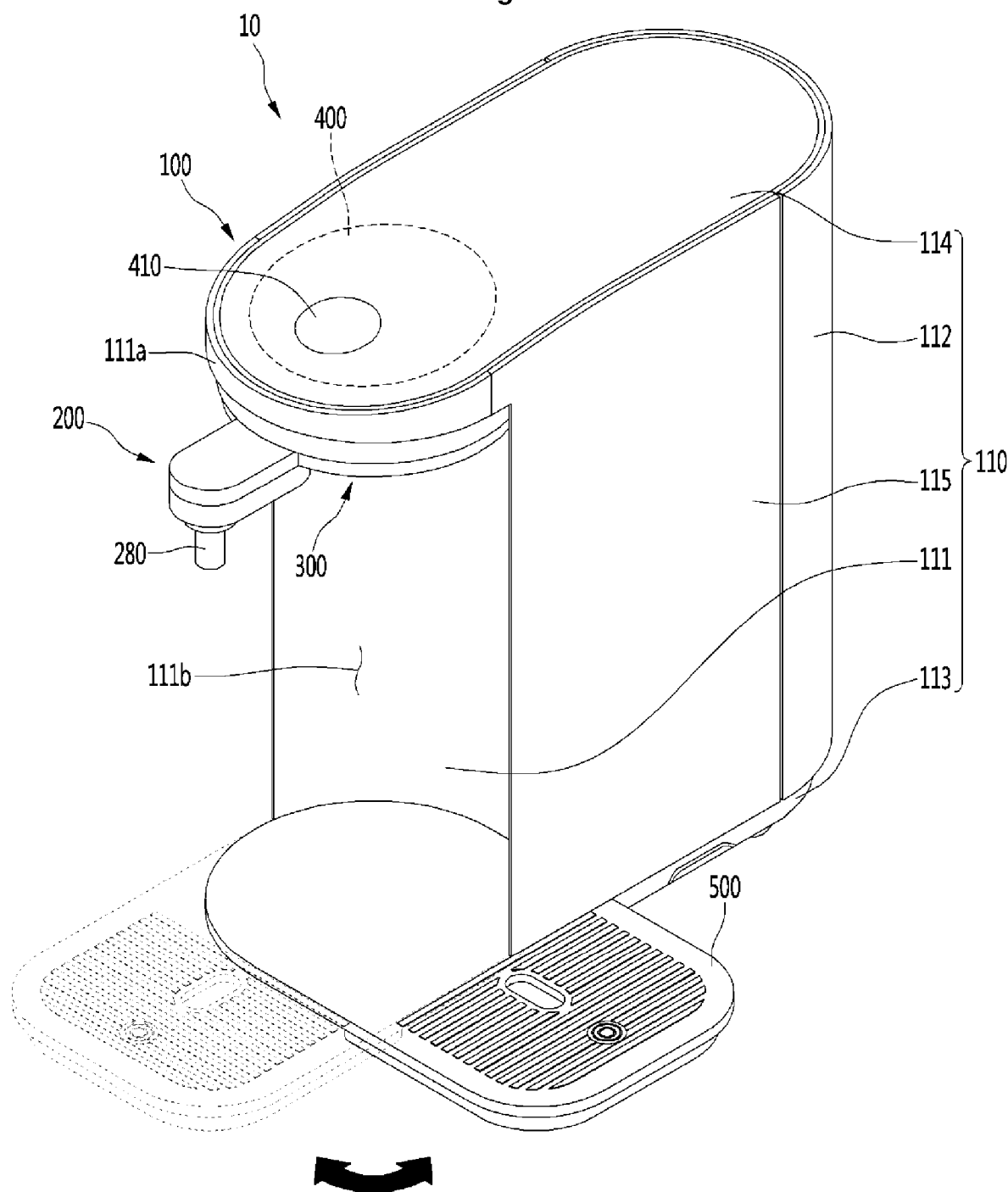
FIG. 9 is a perspective view illustrating a state in which the tray is rotated according to an embodiment.

Hereinafter, the 'tray' 500 that is a portion of the components according to an embodiment will be described. FIG. 9 is a perspective view illustrating a state in which the tray 500 is rotated according to an embodiment, and FIG. 10 is an exploded perspective view illustrating a coupling structure of a base 113 and the tray 500, which are portions of the components according to an embodiment.

Figure 10:
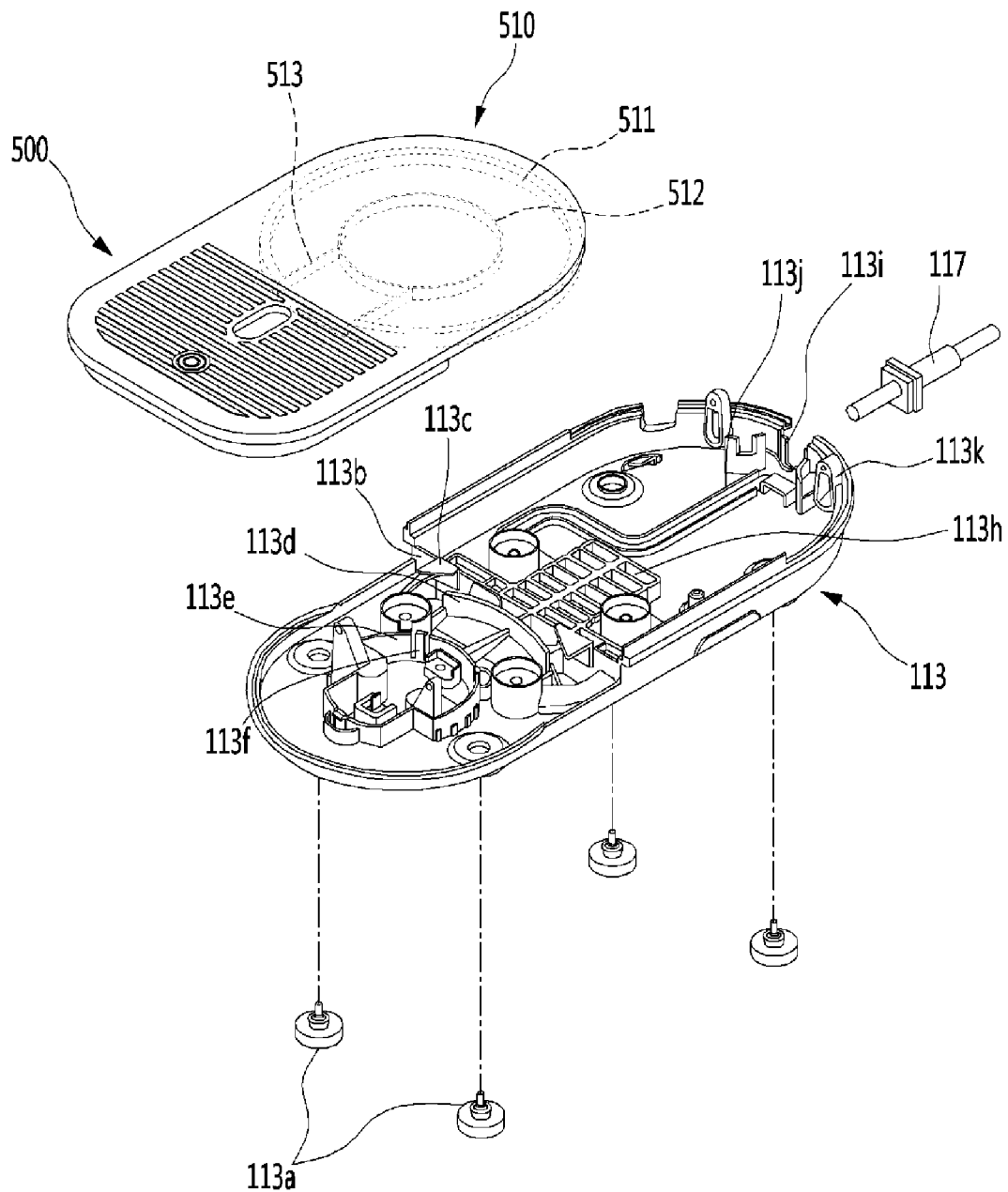
FIG. 10 is an exploded perspective view illustrating a coupling structure of a base and the tray, which are portions of the components according to an embodiment.

Referring to FIGS. 9 and 10, the tray 500 protrudes forward from the front cover 111 and is connected to the base 113. Also, the tray 500 may be provided just below the water discharge module 200. Also, the tray 500 may be rotated by the user's manipulation and be separated from the base 113. In the tray 500, a grill may be provided directly below the water discharge nozzle 280 so that water drops from the water discharge nozzle 280 is stored.

The tray 500 is provided with a rotatable ring 510 rotatably mounted on the base 113. Thus, the tray 500 may be rotated by the rotatable ring 510 in the state of being mounted on the base 113.

The base 113 may define the bottom surface of the water purifier 10. Also, a circumference of the base 113 may extend upward to be coupled to the side panel 115, the front cover 111, and the rear cover 112.

A leg 113a protruding downward may be provided on the base 113. The leg 113a may be provided in plurality on the base 113 so that the entire bottom surface of the base 113 is spaced apart from the ground. Thus, external air may be easily suctioned through the bottom surface of the base 113.

The rotatable ring 510 provided on a rear portion of a bottom surface of the tray 500 is rotatably mounted on a front portion of the base 113. The tray 500 may be rotated in both left and right directions by the rotatable ring 510.

A front portion of an upper end of the base 113 may be stepped at a height less than that of a rear portion of the upper end of the base 113. Also, an opening may be defined between the front portion of the base 113 and lower ends of the front cover 111 and the side panel 115, and the tray 500 may be rotated in both the left and right directions through the opening.

Also, the stepped portion between the front portion and the rear portion of the base 113 may serve as a stopper (or stopper surface) 113b for restricting a rotation angle of the tray 500 when the tray 500 rotates. Also, when the tray 500 rotates, both side surfaces of the tray 500 may come into contact with the stopper 113b to suppress or limit the rotation of the tray 500.

Also, a movement prevention part (or movement prevention protrusion) 113c for preventing the tray 500 from vertically moving extends forward from the stopper 113b of the base 113. The movement prevention part 113c may restrict both sides of the rear end of the tray 500 in the state in which the tray 500 rotates.

A rotation guide part is provided in the base 113. The rotation guide part may include a first rotation guide part (or first rotation guide surface) 113d and a second rotation guide part (or second rotation guide surface) 113e, which are concentrically provided on the base 113. The first rotation guide part 113d may be provided outside the second rotation guide part 113e. Each of the first rotation guide part 113d and the second rotation guide part 113e may protrude upward at a predetermined curvature from the top surface of the base 113 to guide the rotation of the rotatable ring 510. Each of the rotation guide parts 113d and 113e may have a circular shape or an arc shape.

The rotatable ring 510 may be guided by the rotation guide parts 113d and 113e and rotated around the base 113. The rotatable ring 510 may include an outer ring part 511, an inner ring part 512, and a ring joint part (ring joint protrusion) 513.

The outer ring part 511 may provide an outer frame and shape of the rotatable ring 510. The outer ring part 511 has a circular shape, and at least a portion of the outer ring part 511 comes into contact with an outer surface of the first rotation guide part 113d and is rotatably mounted along the first rotation guide part 113d.

Also, the inner ring part 512 is concentrically provided within the outer ring part 511. The inner ring part 512 has a circular shape, and at least a portion of the inner ring part 512 comes into contact with an outer surface of the second rotation guide part 113e to suppress the movement of the base in the front and rear direction. Also, the inner ring part 512 is guided by the second rotation guide part 113e and thus rotatably mounted in place.

A separation prevention protrusion (or separation prevention hook) 113f is provided on the second rotation guide part 113e to prevent the rotatable ring 510 from being separated from the second rotation guide part 113e. An upper end of the separation prevention protrusion 113f may have a hook shape that is hooked with a top surface of the inner ring part 512. Thus, when the tray 500 rotates, the rotatable ring 510 may be lifted upward to prevent the rotatable ring 510 from being separated from the second rotation guide part 113e and stably maintain the rotation of the tray 500.

A suction grill 113h is further provided at the central portion of the base 113. A cord mounting part (or cord mounting opening) 113i to which a power cord 117 is fixed is provided on a rear end of the base 103. Also, a cord guide part (or cord guide protrusion) 113j is provided from the code mounting cord 113i to a central portion of the base 113.

Also, a water inflow tube entrance 113k into which a water inflow tube is introduced is provided in the rear end of the base 113, and the water inflow tube connected to a water supply system is introduced through the water inflow tube entrance 113k.

Embodiments provide a water purifier in which a water discharge nozzle is freely changed in position while elevating or rotating the water discharge nozzle in a state in which the water discharge nozzle is coupled to a main body of the water purifier. Embodiments also provide a water purifier in which an accommodation space below a water discharge nozzle is secured to easily contain water in a container having various sizes.

Embodiments also provide a water purifier in which a water discharge module is smoothly rotated or elevated at a constant rate to change a position of a water discharge nozzle. Embodiments also provide a water purifier that is capable of changing a position of a water discharge nozzle according to various installation environments.

Embodiments also provide a water purifier that is capable of preventing water discharged from a water discharge nozzle from being splashed out of a cup by a head of the water dispensed from the water discharge nozzle. Embodiments also provide a water purifier in which, even though a user's hand is separated from a water discharge nozzle in a state in which the user holds the water discharge nozzle to descend up to a desired position, the water discharge nozzle is fixed to a desired position.

Embodiments also provide a water purifier in which a rotator, on which a water discharge nozzle is mounted, and a movable frame are straightly elevated. Embodiments also provide a water purifier in which a rotator, on which a water discharge nozzle is mounted, and a movable frame are smoothly elevated.

Embodiments also provide a water purifier in which a rotator, on which a water discharge nozzle is mounted, and a movable frame are accurately elevated up to a height that is desired by a user. Embodiments also provide a water purifier in which operational sensitivity felt by a user is improved while a rotator, on which a water discharge nozzle is mounted, and a movable frame are elevated.

Embodiments also provide a water purifier in which a rotator, on which a water discharge nozzle is mounted, and a movable frame are elevated in a front and rear direction or a left and right direction without being shaken. Embodiments also provide a water purifier in which a tray rotates to a position desired by a user and is freely detachable to improve user's convenience.

Embodiments also provide a water purifier in which various parts are not exposed to the outside to realize an elegant outer appearance. Embodiments also provide a water purifier which is hygienic and capable of preventing a water discharge nozzle from being damaged and deformed. Embodiments also provide a water purifier in which a manipulation unit is improved in recognition to allow an adult user as well as a user with a small height to recognize and easily operate the operation unit.

In one embodiment, a water purifier may include: a filter housing defining an accommodation space therein; a water discharge module including a water purifier body including a housing defining an outer appearance and a filter provided in the housing to filter raw water introduced from the outside and a water discharge nozzle mounted on the water purifier body to supply the water passing through the filter to the outside of the water purifier body; and a tray provided below the water discharge module, wherein the water discharge module includes: an elevation unit elevatably mounted on a front surface of the water purifier body so as to be elevated with respect to the water purifier body; and a rotator having one side in which the water discharge nozzle is provided, rotatably mounted on the elevation unit, and allowing the water discharge nozzle to vary in position while being rotated with respect to the elevation unit.

The elevation unit may include: a fixed frame fixed to an upper end of a front surface of the water purifier body; a movable frame to which the rotator and the water discharge nozzle are fixed, which is elevatably coupled to the fixed frame, and which allows the rotator and the water discharge nozzle to vary in height; and a resistance unit provided on the fixed frame or the movable frame to reduce elevation force applied to the movable frame so that the movable frame ascends or descends.

A guide part guiding the movable frame to be straightly elevated may be provided on the fixed frame or the movable frame. The guide part may include: a guide groove defined along an elevation direction in the fixed frame; and a guide piece provided on the movable frame and inserted into the guide groove. The guide piece may be rotatably mounted on the movable frame.

First gear teeth may be provided on the inside of the guide groove, and second gear teeth engaged with the first gear teeth may be provided on an outer circumferential surface of the guide piece.

The resistance unit may be provided as an oil damper, and the guide piece may be connected to a rotation shaft of the resistance unit. The resistance unit may be provided as an oil damper.

At least one of the fixed frame and the movable frame may be made of an engineering plastic material having lubricity. A front cover constituting the front surface of the water purifier body may be recessed backward.

The rotator may be rotatably mounted on a lower portion of a hollow rotator housing, which is coupled to the elevation unit and has opened upper and lower portions. The rotator housing may have an upper end that protrudes forward from an upper end of the water purifier body and a lower portion that is elevated in a state of being accommodated in an opened upper cover.

The housing of the water purifier body may further include a base defining a bottom surface thereof, and the tray may be rotatably mounted on the base. The base may further include a rotatable ring rotatably mounted, and the tray may be detachably mounted on the rotatable ring. A water discharge button for manipulating water discharge may be provided on a top surface of the water purifier body or a top surface of the water discharge module.

Although the embodiments are exemplified with respect to the accompanying drawings, those having ordinary skill in the art to which the present disclosure pertains will be understood that the present disclosure can be carried out in other specific forms without changing the technical idea or essential features. In addition, although explaining the embodiments of the present disclosure and explaining the operation and effect according to the constitution of the present disclosure have not been explicitly described, it is needless to say that a predictable effect is also recognized by the constitution.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid purifier comprising:
   a liquid purifier body that defines an outer appearance of the liquid purifier;
   a filter provided in the liquid purifier body to filter raw liquid introduced from outside the liquid purifier body;
   a dispenser received in the liquid purifier body, the dispenser including:
      a liquid discharge nozzle that supplies the filtered liquid;
      an elevation assembly mounted to a front surface of the liquid purifier body so as to be vertically movable with respect to the liquid purifier body; and
      a rotator ring having a side on which the liquid discharge nozzle is provided, the rotator ring being rotatably mounted on the elevation assembly such that a rotation of the rotator ring causes the liquid discharge nozzle to be rotated with respect to the elevation assembly, and a vertical movement of the elevation assembly causes the rotator ring and the liquid discharge nozzle to move vertically with respect to the liquid purifier body;
   a guide that guides the rotator ring to move vertically in a straight line with respect to the front surface of the liquid purifier body; and
   a tray provided below the dispenser.

2. The liquid purifier according to claim 1, wherein the elevation assembly includes:
   a fixed frame fixed to an upper end of a front surface of the liquid purifier body;
   a movable frame to which the rotator ring and the liquid discharge nozzle are coupled, the movable frame being elevatably coupled to the fixed frame such that a vertical movement of the movable frame causes the rotator ring and the liquid discharge nozzle to vary in height relative to the tray; and
   a resistance damper provided on at least one of the fixed frame or the movable frame to reduce an elevation force applied to the movable frame when the movable frame ascends or descends.

3. The liquid purifier according to claim 2, wherein the guide is provided on at least one of the fixed frame or the movable frame, the guide directing the movable frame to move vertically with respect to the fixed frame.

4. The liquid purifier according to claim 3, wherein the guide includes:
a guide groove defined along an elevation direction in the fixed frame; and
a guide wheel provided on the movable frame and inserted into the guide groove.

5. The liquid purifier according to claim 4, wherein the guide wheel is rotatably mounted on the movable frame.

6. The liquid purifier according to claim 5, wherein first gear teeth are provided on an interior surface of the guide groove, and second gear teeth that engage the first gear teeth of the guide groove are provided on an outer circumferential surface of the guide wheel.

7. The liquid purifier according to claim 6, wherein the resistance damper is an oil damper, and the guide wheel is connected to a rotation shaft of the resistance damper.

8. The liquid purifier according to claim 2, wherein the resistance damper is an oil damper.

9. The liquid purifier according to claim 2, wherein at least one of the fixed frame or the movable frame includes polyoxymethylene (POM).

10. The liquid purifier according to claim 1, wherein the front surface of the liquid purifier body is recessed.

11. The liquid purifier according to claim 1, wherein the rotator ring is rotatably mounted on a lower portion of a hollow rotator housing, which is coupled to the elevation assembly and has an upper opening and a lower opening.

12. The liquid purifier according to claim 11, further comprising a guide bracket mounted on at least one of the upper opening or the lower opening of the rotator housing to guide a rotation of the rotator ring.

13. The liquid purifier according to claim 11, further comprising:
an oil damper on which a pinion is mounted on a rotation shaft thereof and provided on the rotator ring; and
an internal gear extending along a curvature and provided on the rotator housing,
wherein when the rotator ring is rotated, the pinion is moved along the internal gear.

14. The liquid purifier according to claim 11, wherein the rotator housing has an upper end that protrudes forward from an upper edge of the liquid purifier body and a lower end that extends downward while the rotator housing is accommodated in an opened upper cover of the liquid purifier body.

15. The liquid purifier according to claim 1, wherein the liquid purifier body further includes a base defining a bottom surface thereof, and
the tray is rotatably mounted on the base.

16. The liquid purifier according to claim 15, wherein the tray includes a rotatable ring, and
the rotatable ring is detachably mounted on the base.

17. The liquid purifier according to claim 15, wherein a liquid discharge button to receive a user input to discharge the filtered liquid is provided on at least one of a top surface of the liquid purifier body or a top surface of the dispenser.

18. A liquid purifier comprising:
a liquid purifier body that defines an outer appearance of the liquid purifier;
a filter provided in the liquid purifier body to filter raw liquid introduced from outside the liquid purifier body; and
a dispenser received in the liquid purifier body, the dispenser including:
a liquid discharge nozzle that supplies the filtered liquid;
a fixed frame coupled to a front surface of the liquid purifier body;
a movable frame that is slidably coupled to the fixed frame; and
a rotator ring coupled to the liquid discharge nozzle and rotatably coupled to the movable frame such that a rotation of the rotator ring causes the liquid discharge nozzle to be rotated with respect to the movable frame, and a vertical movement of the movable frame causes the rotator ring and the liquid discharge nozzle to move vertically with respect to the fixed frame and the liquid purifier body.

19. The liquid purifier according to claim 18, further comprising:
a resistance damper provided on at least one of the fixed frame or the movable frame to reduce an elevation force applied to the movable frame when the movable frame ascends or descends.

20. The liquid purifier according to claim 18, further comprising:
a guide groove defined along an elevation direction in the fixed frame; and
a guide wheel provided on the movable frame and inserted into the guide groove to engage an interior surface of the guide groove.

* * * * *